July 26, 1960 M. RICHELSEN 2,946,668
CONTINUOUS HIGH-TEMPERATURE REACTION APPARATUS
Filed May 28, 1954
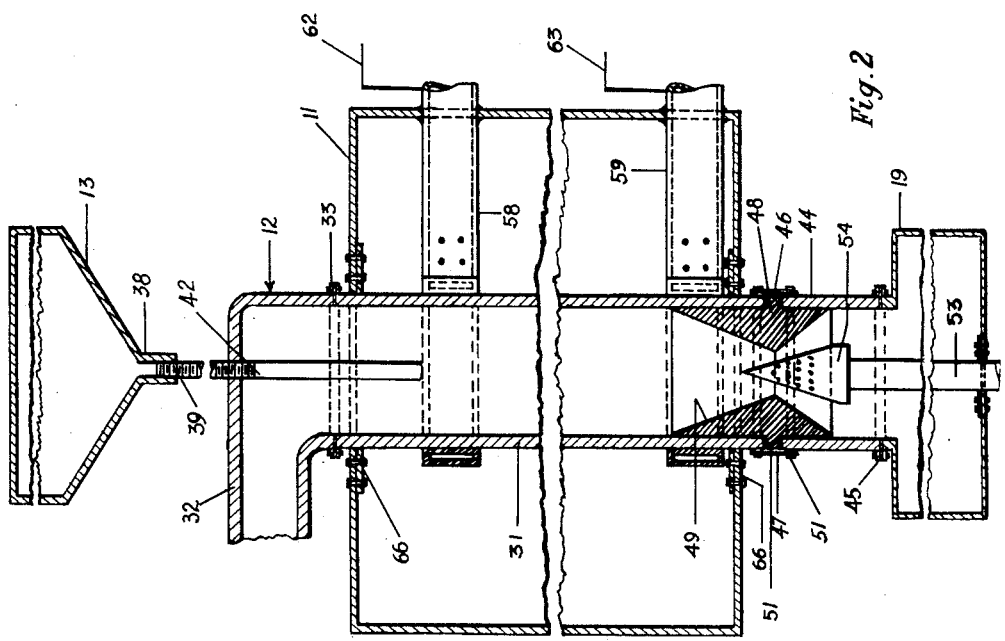
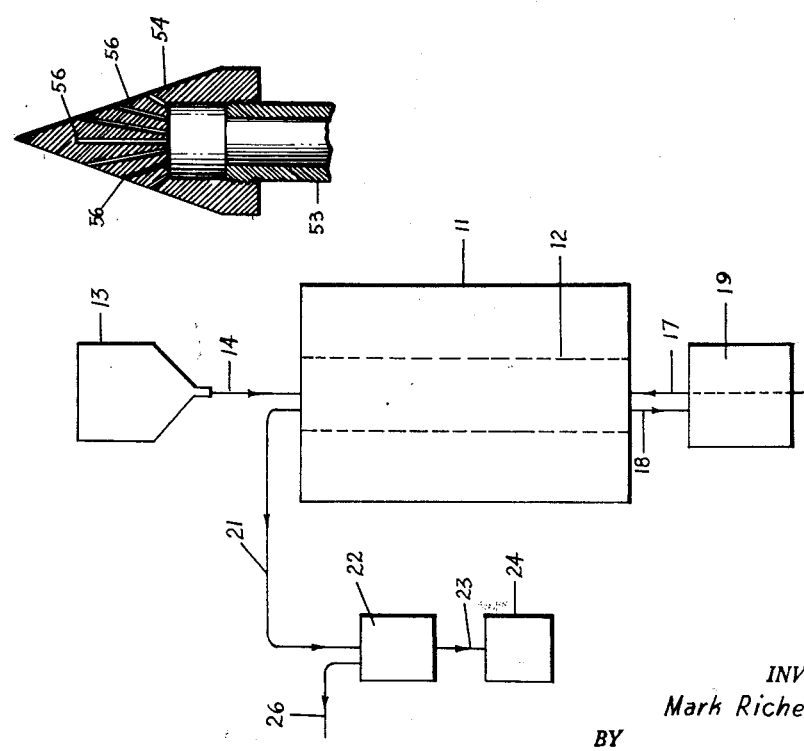
INVENTOR.
Mark Richelsen
BY
ATTORNEY United States Patent Office 2,946,668
Patented July 26, 1960

2,946,668
CONTINUOUS HIGH-TEMPERATURE REACTION APPARATUS

Mark Richelsen, Olcott, N.Y., assignor to Metal Chlorides Corporation, Middleport, N.Y.

Filed May 28, 1954, Ser. No. 433,200
4 Claims. (Cl. 23—277)

The invention of the present application relates to apparatus for carrying out continuous, high temperature reaction processes. It is particularly concerned with high temperature halogenation and the formation of halides of metals and metalloids.

It is an object of the invention to provide an apparatus by which the halides of various metals and metalloids may be made by a continuous high temperature reaction.

Another object of the invention is to provide an apparatus in which the temperature of a reaction of the character described may be accurately and conveniently controlled.

A further object of the invention is to provide an apparatus for producing halides of metals and metalloids in which the reacting materials may be introduced into the reaction chamber in proper proportions.

Another object of the invention is to provide an apparatus of the character described in which the metal or metalloid halides produced may readily be separated from the reacting materials.

Other objects and advantages of the present invention will be apparent from the following description taken in conjunction with the accompanying drawings in which:

Figure 1 is a schematic view of one form of apparatus adapted for carrying out processes according to the present invention; and Figure 2 is an enlarged, vertical sectional view through the reactor portion of the apparatus shown in Figure 1; and Figure 3 is an enlarged, detail view of the nozzle shown in Figure 2.

Heretofore the production of metal and metalloid halides in many cases has been a difficult and expensive operation because of the high temperatures required for the reactions involved. The activity of the halogens, i.e. chlorine, bromine, iodine and fluorine, at high temperatures is very great and the provision of apparatus siutable for carrying out such processes was often not only difficult but such apparatus in many cases was expensive and inefficient. It has now been discovered that production of halides of metals and metalloids may be carried out in a continuous process, even in cases where reaction temperatures as high as 2000° F. or higher are required, by the use as a reactor of a heated carbon or graphite tube that has been impregnated with carbon and has thus been rendered substantially impervious to liquids, vapors and gases, even under moderate pressures and at elevated temperatures. Such tubes are manufactured and sold under the trademark "Graph-i-tite" and are extremely resistant to corrosion since they are more than 99.5% carbon.

The process is usable in preparing the halides of a large number of metals and metalloids. In fact, the halides of nearly all metals and metalloids may be prepared by the herein-described process. The process is, however, of particular importance in connection with the preparation of the halides of the following: alkali metals such as lithium and potassium; other metals of group I of the periodic table such as copper and silver; group II metals such as beryllium and magnesium; group IV metals such as titanium, zirconium, tin and thorium; aluminum, antimony, chromium, uranium and the rare earth metals; and the metalloids boron and silicon.

As raw materials for carrying out the present process the metals or metalloids themselves may be used. In most cases, however, it will be advantageous to use a compound of the metal or metalloid. Such a compound may be either a manufactured one or a natural compound such as is found in the ores (including mined ores, sands and the like, as well as concentrates thereof) of the metal or metalloid, either refined or unrefined. Among the metal and metalloid compounds which are particularly useful are carbides, nitrides, carbonitrides, cyanonitrides, cyanides, borides, silicates, silicides, and oxides. With certain of these compounds, such, for example, as the oxides and silicates, it is necessary to introduce with the compound a reducing agent such as carbon or iron.

The metal or metalloid or compound, ore or the like thereof (which will be hereinafter generally and inclusively referred to as "metal feed material") may be used in granular or powdered form or in the form of pellets produced from a granular or powdered material. Where other materials, such as carbon, are introduced into the reactor with the metal feed material, they may be added in any convenient way, as for example, either in powdered or granular form or in pellets with the metal feed material.

The halogenating agent used may be a more or less pure halogen, or a halogenated compound or halogen derivative which, at the temperature to which the contents of the reactor are raised will either break down and liberate its contained halogen or be so unstable as to permit its contained halogen to react with the metal feed material. Among the halogen-containing materials which may be found useful in some cases are: aliphatic halides, such as ethylene bromide, chloroform, methyl chloride, ethyl bromide, vinyl bromide, propyl iodide, butyl chloride, dichloromethane, carbon tetrachloride, hexachloroethane, trichloromethyl chloroformate, and trichloronitromethane; aryl halides such as phenyl chloride and benzyl bromide; and other halogen-containing materials, such as carbonyl chloride, beta-chlorovinyl dichlorarsine and ethyldichlorarsine. When desired two or more halogenating agents may be used together.

In the accompanying drawing there is illustrated one embodiment of apparatus for carrying out processes according to the present invention in a satisfactory and efficient manner.

In the schematic system of Figure 1 the reference numeral 11 designates an insulating jacket for the reactor 12 (shown in dotted lines) therein. The reactor, shown in more detail in Figure 2, comprises an elongated tube and is adapted to receive from the feed bin 13, through the line 14, the metal feed material which it is desired to halogenate. At the bottom of the reactor 12 there is provision for entry of a halogenating agent through the line 17 and for passage from the reactor through the line 18 of unreacted or residual feed material into a collecting bin or hopper 19. The gaseous or vaporized products of the reaction together with any unreacted halogenating agent are led from the reactor by the line 21 to a condenser 22. In this condenser certain products of the reaction may be solidified, or liquified and carried by the line 23 to a storage tank 24. Other reaction products and unreacted halogenating agent may be led fromt he condenser, as through line 26, to additional apparatus (not shown) in which they may be recovered.

It will be seen from Figure 2 that the reactor 12 comprises a vertical tube 31 of carbon or graphite which has been impregnated with carbon to render it substantially impervious to liquids, vapors and gases even at elevated temperatures. At its upper end the reactor tube 31 is joined to an L 32 of the same material by suitable means such as a clamped gasketed connection 33. Above the reactor tube 31 there is provided a feed hopper or bin 13, the inlet of which can be sealed. The bottom of the feed bin 13 is provided with tapered sides and an outlet 38 which has attached thereto, as by threads 39, a feed tube 42 that extends downwardly through the L 32 into the reactor tube 31 and is open at its lower end. Metal feed material passes by gravity from the bin 13 through the tube 42, corresponding to line 14 in Fig. 1, into the reactor. The feed tube being subjected to the corrosive conditions existing within the reactor is preferably formed of graphite or carbon which has been rendered impervious by carbon impregnation.

At its lower end the reactor tube 31 is joined to an outlet tube 44 which is in turn joined by a gasketed connection 45 to a receiving or collecting bin or hopper 19. Interposed between the lower end of the reactor tube 31 and the outlet tube 44 is the peripheral flange 46 of a carbon or graphite, venturi-like annulus or throat 48. Gaskets 51 are inserted between the ends of the tubes 31 and 44 and the flange 46 and the assembly is held together by clamping members 47. The upper and lower edges of the throat 48 project, respectively, into the ends of the tubes 31 and 44. At least the flange 46 of the annulus 48 is impregnated with carbon to render it impervious.

Projecting upwardly through the collecting bin or hopper 19 is a tube 53 through which a halogenating agent such as gaseous chlorine, for example, may be admitted to the reactor. At its upper end the inlet tube 53 is threadedly engaged in a conical nozzle 54 that is provided with a plurality of perforations 56 through which the halogenating agent may pass into the reactor. The inlet tube 53 carrying the nozzle 54 is adapted to be moved vertically so that the nozzle may close the opening 49 through the throat 48 and thereby prevent passage of material from the reactor into the hopper 19. Both the tube 53 and the nozzle 54 are made of carbon or graphite.

The reactor 12 and the charge of metal feed material therein are heated by using a portion of the reactor tube 31 as a resistance heating element. To accomplish this, the tube 31 is encircled adjacent its upper and lower ends with tubular contact members 58 and 59, preferably of nickel, which are connected by the leads 62 and 63, respectively, to a suitable source of electric current. Passage of the current through the reactor tube 31 between the contact members 58 and 59 heats the tube and this results in the heating of the reactor contents and establishment of the halogenation reaction therein. The tubular contact members 58 and 59 are cooled by passing water or other suitable cooling fluid therethrough. This also results in cooling the ends of the reactor tube 31 so that the temperature thereof will be low enough to permit the use of gaskets and to minimize oxidation of portions of the tube exposed to air. The reactor 12 is insulated by surrounding the heated portion of the reactor tube 31 with a jacket 11 packed with a suitable corrosion-resistant material of low heat conductivity such as carbon black. Sealing between the jacket 11 and the reactor tube 31 is secured by the use of suitable gaskets 66 fastened to the jacket. A suitably sealed manhole or access door (not shown) may be provided in the jacket 11 to permit repair or replacement of the reactor tube.

All of the elements and parts of the apparatus with which chlorine or other corrosive halogenating agent may come in contact should be formed of resistant material such as carbon, graphite or nickel. Thus, for example, the jacket 11, the feed bin 13, and the receiving bin or hopper 19, are preferably formed of nickel. Instead of using gaskets (that may be of resistant material such as graphitized asbestos or polytetrafluoroethylene, or may be formed as a nickel shell packed with asbestos) joints between the tube 31, the L 32 and the tube 44 may be made by coating the adjacent areas of the tubes with a carbonaceous cement or the like and holding the ends together by means of collars and bolts or by other suitable means. Alternatively, if desired, threaded joints may be employed; or combinations of cements, gaskets and threading may be used.

In the following example the operation of the illustrated apparatus is described in connection with the preparation of titanium tetrachloride by chlorination of titanium carbide.

*Example 1*

With the nozzle 54 in raised position so that passage of material through the graphite throat 48 is prevented, titanium carbide in granular form is placed in the feed bin or hopper 13 after which the inlet opening of the bin (not shown) is sealed gastight. As the bin or hopper 13 is filled with the granules of titanium carbide the interior of the reactor tube 31 is also filled therewith through the feed tube 42 from the throat 48 to the lower end of the feed tube. A cooling fluid such as water or brine is then circulated through the upper and lower tubular contact members 58 and 59 and electrical connections are made with the leads 62 and 63 to a suitable source of low voltage (about 25-volt) electric current. The power demand will of course depend upon the size of the reactor and the temperature to which it must be heated. For a reactor having a 6-inch interior diameter, and a 60-inch length between the tubular members 58 and 59, approximately 20 kw.-hr. will be required when making titanium tetrachloride by reacting chlorine with titanium carbide.

As the temperature of the reactor tube 31 increases the granular charge therein is heated. The temperature of the tube is raised until it is about 50° higher than the reaction temperature desired. In the case of titanium carbide, the reaction temperature will vary between about 390° F. and 935° F., depending upon the composition of the carbide. When this temperature has been reached chlorine is introduced into the reactor through the perforations 56 in the nozzle 54. A body of porous carbon or graphite or a perforated nozzle of other resistant material may be used instead of the nozzle 54. At the same time the nozzle is lowered slightly to permit passage through the throat 48 of residual carbon and any unreacted titanium carbide. These materials fall through the pipe or tube 44 into the receiving bin 19 from which they may be removed as desired. As the chlorine rises through the bed of hot, granular titanium carbide, it reacts therewith to form titanium tetrachloride. The tetrachloride and unreacted chlorine pass upwardly through the reactor and are carried therefrom by the L 32 and through a suitable conduit of nickel or impervious carbon or graphite 21 to the condenser 22. In the latter the titanium tetrachloride is condensed to a liquid while the unreacted chlorine passes out through the line 23 and may be collected and reused.

Flow of titanium tetrachloride vapor and unreacted chlorine from the reactor 12 is produced by the expansion of gases and vapors within the reactor as a result of the elevated temperature therein. The chlorine is introduced into the reactor under such pressure as is required to permit the necessary amounts to be fed, which assists in causing flow through the system. As the reaction progresses and titanium tetrachloride is carried from the reactor, the bed of granular material therein decreases in volume. Moreover, since the nozzle 54 is spaced downwardly from the throat 48 a flow of residual material is continuously passing from the bottom of the reactor into the bin 19. The reactor is maintained filled to the desired level, however, by the entry of fresh, granular titanium carbide passing downwardly through the feed tube 42. The temperature of the reaction may be controlled by varying or regulating the amount of current supplied to the tubular members 58 and 59, thereby increasing or decreasing the temperature of the tube 31, and the intensity of the reaction may also be controlled by varying the amount of chlorine introduced through the nozzle 54. With proper regulation of the chlorine input and the temperature in the reaction chamber it is possible to obtain substantial conversion of the titanium content of titanium carbide into titanium tetrachloride.

*Example 2*

Silicon tetrachloride may be made in substantially the same manner as described above in connection with the preparation of titanium tetrachloride. For the preparation of the former, granular silicon carbide is used as the raw material and the reactor is heated to a temperature of from about 1200° F. to 1750° F. The effluent gases or vapors from the reactor pass into the condenser 22 and the silicon tetrachloride may be withdrawn therefrom as a liquid while the unreacted chlorine, as before, passes out through the line 23 and may be separately condensed or fed back into the chlorine inlet of the reactor.

In carrying out high temperature halogenation processes in accordance with the present invention the ratio of the height of the bed of metal feed material in the reactor to the cross section thereof is important. With a fixed input of halogenating agent a high ratio is conducive to greater efficiency than a low ratio. However, beyond a certain height the back pressure in the bed becomes undesirably high and this condition is made worse when the metal feed material is very fine in size. In general it has been found that operation with a ratio of bed height to diameter of at least 10:1 is desirable. In some cases, where, for example, the metal feed material is in rather large granules or pellets or is mixed with large pellets or granules of a carrier or reducing agent, higher ratios may be employed with advantage.

It will be clear that after the reaction has started material is being continually withdrawn from the bed at the bottom thereof while fresh metal feed material is supplied to the bed through the feed tube 42. The bed is thus kept at a constant height and control of the reaction is therefore greatly facilitated. The incoming material is quickly heated to reaction temperature by the hot gases and vapors rising through the bed as well as by contact with and radiation from the underlying portion of the bed and the heated reactor tube 31.

Obviously, the temperature required in the reactor depends upon several factors and will vary widely. Among such factors are the halogenated product being made, the metal feed material being used and the form in which the halogen is introduced. For example, although titanium tetrachloride may be produced satisfactorily at a maximum temperature of about 935° F. from titanium carbide and chlorine, if a mixture of rutile and carbon is used as the metal feed material a temperature of from about 1560° F. to about 2285° F. is required. In addition, the nature of the metal feed material and the type of halogenating agent employed will affect the rate at which material is permitted to flow from the reactor and the rate at which the halogenating agent is fed thereto.

In cases where halogenating agents which are non-gaseous at normal temperatures, such as bromine and hexachloroethane, are used the agent may be heated to vaporize it prior to introduction into the reactor, or, if desired, the agent may be introduced as a liquid. Further, if desired, the halogenating agent may even be introduced as a halogen-containing compound admixed with the metal feed material so that the halogen will be released when the charged material has been heated to a predetermined temperature in the reactor. As pointed out above, the metal feed material may be introduced into the reactor in the form of pellets, granules or powder and may, if desired or necessary, be admixed or pelleted with other substances. Such substances include reducing agents such as carbon or iron, halogenating agents, catalysts, and inert carriers. The latter may be employed when the metal compound used, for example a glass, melts below the required temperature for halogenation. In such cases the molten metal compound may be held on the surface and/or in the pores of a granular material that is inert under the reaction conditions. Granular porous carbon present as a reducing agent may also be employed as a carrier for molten metal compounds.

From the foregoing description it will be evident that by the use of a tubular, carbon impregnated, carbon or graphite reactor heated by the electrical resistance of the reactor itself there is provided a novel and useful method for carrying out halogenation reactions which require elevated temperatures, as well as novel and efficient apparatus for use in such process. Tubular reactors of carbon or graphite according to the present invention are not readily wetted by molten metals or salts and not only are very resistant to chemical attack at elevated temperatures if kept free of contact with oxidizing atmospheres or materials, but are also substantially impervious at such temperatures. The electrical characteristics of the material from which the reactors are formed are such that they may conveniently be heated by resistance; and, because of its high thermal emissivity, the heat thus generated is made readily available to the reaction. No other material combines all of these desirable properties.

By the herein described process continuous halogenation reactions may be carried on at temperatures as high as 2000° F. or even higher. The process may be accurately controlled since a bed of metal feed material of constant depth may be maintained in the reactor, the amount of halogenating agent used may be easily regulated, and the temperature of the reactor may be easily adjusted. Thus, a high degree of efficiency is possible.

It will be obvious that the apparatus described herein and illustrated in the accompanying drawings may be modified in many ways without departing from the spirit of the present invention. Thus, for example, separate blocks of graphite fitted to the reactor tube may be used as electric contacts thereon instead of using the tubular nickel cooling elements as contacts. Moreover, the size, number, and location of such cooling elements may be varied as required by the size of the reactor, the type and temperature of the reaction therein, and the desired temperatures of the conduits attached to the reactor and of the products of the reaction. Indeed, if desired, cooling elements may be placed around the outlets 32 and 44. Furthermore, while the reactor tube has been shown and described as being in vertical position with the metal feed material flowing by gravity from above and the halogenating agent passing upwardly therethrough, the reactor tube, if desired, may be horizontal or in an inclined position and the reacting materials and products of reaction may, respectively, be introduced and removed in any other suitable manner.

It will also be understood that the products of reaction obtained in carrying out the novel process of the present invention may be separated, fractionated, purified and otherwise treated in accordance with any desired and suitable procedure; and that when feasible unreacted materials may be fed back into the reactor.

As mentioned above, low voltage electrical current may be used for heating the reactor tube. It will be understood, however, that the voltage employed will vary with the construction and size of the reactor, the power requirements, and other factors. Either direct or alternating current may be used, the choice depending upon which is more convenient or suitable.

It is therefore intended that the invention shall not be considered limited to the embodiment and examples shown and described, but shall be interpreted as broadly as permitted by the appended claims.

In the foregoing specification and the following claims the term "metal feed material" refers to material introduced into the reactor for reaction with a halogenating agent and, except as otherwise indicated, is meant to include halide-forming metalloids and metals, as such, as well as compounds, salts, ores, sands, glasses, and the like in which a halide-forming metal or metalloid is combined, whether or not the same are mixed with other materials such as reducing agents, carriers, halogenating agents, catalysts and the like. The term "halogenating agent" is meant to include not only elemental halogens, but also compounds thereof that under the reaction conditions will form halides of one or more metals and/or metalloids in the metal feed material. The term "carbon," except where a more limited meaning is evident, is intended to include both carbon and graphite; the conditions of use determine which one is preferred for a particular purpose or application.

I claim:

1. Apparatus adapted for high-temperature halogenation which comprises an elongated reactor tube, said tube being formed of carbon and being impregnated with carbon to render it impervious to fluids at elevated temperatures, longitudinally spaced means engaging said tube and adapted to serve as electrical contacts for passing electrical current through said tube, an outlet member at one end of said tube, feed means projecting through said outlet member into said tube, an aligned tubular outlet at the other end of said tube, a removable graphite throat projecting into said tube and said outlet and providing a passage therebetween, a graphite nozzle adapted to engage in said throat to close said outlet, said nozzle being perforated for passage of fluid therethrough, a graphite pipe attached to and carrying said nozzle for feeding fluid to said nozzle, a jacket surrounding said tube and extending for substantially the full length thereof, and insulating material within said jacket and around said tube.

2. Apparatus as set forth in claim 1 in which cooling means is provided for a portion of said tube.

3. Apparatus adapted for high-temperature halogenation which comprises an elongated reactor tube, said tube being formed of carbon and being impregnated with carbon to render it impervious to fluids at elevated temperatures, longitudinally spaced internally-cooled means directly engaging said tube and adapted to serve as electrical contacts for passing electrical current through said tube, to heat said tube an outlet member for the reaction products and feed means for feed material into said tube at one end of the tube, an outlet for residual feed material at the other end of said tube, said outlet including a venturi-shaped carbon throat and a vertically movable member co-acting with said throat, means for introducing a halogenating agent into said tube, a jacket surrounding said tube and extending for substantially the full length thereof, and insulating material within said jacket and around said tube.

4. Apparatus adapted for high-temperature halogenation which comprises an elongated reactor tube surrounded for substantially its entire length by a spaced housing containing insulating material, said tube being formed of fluid-impervious, carbon-impregnated carbon and having means for electrical heating thereof comprising two hollow, fluid-cooled, longitudinally-spaced, electrodes directly secured to the outside of said tube within said housing, which tube constitutes an electrical resistance heating element, means for introducing feed material into said tube adjacent one end thereof, means for introducing a halogenating agent into said tube adjacent the opposite end thereof, means for withdrawing reaction products from the first-mentioned end of said tube and means within and adjacent to second-mentioned end of said tube for regulating the flow of residual feed material from said tube, said last-mentioned means including a venturi-shaped carbon throat and a vertically movable member co-acting with said throat.

References Cited in the file of this patent

UNITED STATES PATENTS

| | | |
|---|---|---|
| 1,220,391 | Bacon et al. | Mar. 27, 1917 |
| 1,925,784 | Williams | Sept. 5, 1933 |
| 1,937,885 | Gitzen et al. | Dec. 5, 1933 |
| 2,104,741 | Fink | Jan. 11, 1938 |
| 2,184,885 | Muskat et al. | Dec. 26, 1939 |
| 2,240,345 | Muskat | Apr. 29, 1941 |
| 2,277,220 | Gailey | Mar. 24, 1942 |
| 2,392,682 | Marek | Jan. 8, 1946 |
| 2,622,005 | Aagaard et al. | Dec. 16, 1952 |
| 2,668,750 | Krchma | Feb. 9, 1954 |
| 2,670,272 | Nutting | Feb. 23, 1954 |
| 2,681,943 | Hartwick | June 22, 1954 |
| 2,773,736 | Hollingsworth | Dec. 11, 1956 |
| 2,832,672 | Fetterley et al. | Apr. 29, 1958 |

FOREIGN PATENTS

| | | |
|---|---|---|
| 550,379 | Great Britain | Jan. 5, 1943 |

OTHER REFERENCES

"Carbon and Graphite Products," Catalog Sec. M-8000A; pages 2, 3 and 10. Published by National Carbon Co., Inc.